United States Patent Office 3,016,384
Patented Jan. 9, 1962

3,016,384
PROCESS FOR THE MANUFACTURE OF COLOR
PIGMENTS IN FINELY DIVIDED FORM
Armin Caliezi, Basel, Switzerland, assignor to Ciba
Limited, Basel, Switzerland
No Drawing. Filed July 2, 1959, Ser. No. 824,467
Claims priority, application Switzerland July 20, 1956
3 Claims. (Cl. 260—314.5)

The present application is a continuation-in-part of my application Serial No. 671,712, filed July 15, 1957 (now abandoned).

This invention relates to the manufacture of color pigments in finely divided form.

As is known, most organic dyestuffs obtained by synthesis occur in a physical form in which they are of no value as pigments. There certainly are pigments that occur in an aqueous medium in relatively fine distribution but on ordinary drying of such pigment dispersions increase of grain size and hardening frequently take place so that after drying, the resulting pigment is of no value in the form in which it is obtained.

Such agglomeration on drying can indeed be avoided by converting the pigment by the so-called "Flush" process into an organic substratum with preservation of the fine state of distribution. This process is complicated and the applications of resulting pigment dispersions are limited.

Various methods are also known for converting the crude dyestuff into a form useful as a pigment dyestuff. For example, the crude dyestuff is suspended or dissolved in sulfuric acid and reprecipitated by pouring into water. According to other methods, the crude pigment is treated with an organic liquid, preferably while mechanically working, or is ground with a solid grinding substratum. All these processes necessitate a considerable expenditure and often give unsatisfactory results.

The present invention is based on the observation that in a very simple manner organic color pigments of high color strength and soft grain can be obtained, which are distinguished by a very ready capacity for distribution in a wide variety of substrata, when crude pigments of organic dyestuffs are heated in an aqueous medium until after removal of the aqueous phase an easily distributed pigment of good color strength is obtained.

In order to effect the conversion in a period of time which is sufficiently short for practical requirements, it is to be recommended to work, for example, at the boiling point of water or at temperatures above 90° C., preferably at temperatures lying above the boiling point of water, for example, between 100 and 300°. In this latter case the operation must be conducted in a pressure vessel. The conversion can also be accelerated by addition of water soluble or insoluble inorganic reagents or small quantities, i.e. at most 10% calculated on the quantity of water, of organic reagents. For example, inorganic acids such as sulfuric acid, hydrochloric acid or phosphoric acid, or alkalies such as alkali metal and alkaline earth metal hydroxides, or inorganic salts such as carbonates, chlorides or sulfates can be used. As suitable organic additions may be mentioned: acids such as formic acid, acetic acid, oxalic acid, benzoic acid, phthalic acid or benzene sulfonic acid and also their salts and amides, bases such as ethanolamine, diethanolamine, aniline, pyridine or quinoline or solvents such as chlorobenzene or o-dichlorobenzene, and also water soluble, surface active organic compounds.

The time required for conversion into a pigment of good color strength depends essentially upon the temperature at which the conversion is carried out. At temperatures substantially above 100° C. in general it is necessary to heat at least one hour, whereas at temperatures around the boiling point of water at least 10 hours are required. In addition to an increase of temperature also the already mentioned additions can effect an acceleration of the conversion.

The ratio of pigment to aqueous medium is limited to the extent that so much aqueous medium must be present that all of the particles are surrounded thereby, preferably at least one part of aqueous medium is used to one part of pigment. Apart from this the quantity of the aqueous medium can be as large as desired, an upper limit being determined only by economic consideration.

In many cases it is of advantage to maintain the mixture in motion during the conversion, for example by mechancal stirring.

When the conversion is complete, the working up can take place in various ways depending upon the purpose of application of the pigment. The pigment can, for example, be filtered from the aqueous medium and if necessary washed. After drying of the filter cake, advantageously under vacuum, the pigment occurs as a fine powder which no longer cakes together, is of extremely soft grain and is suitable directly for incorporation in organic or inorganic substrate. The aqueous filter cake can, however, also be directly mixed with a lipophile substratum until the pigment particles have wandered from the aqueous to the lipophile phase, whereby the stage of evaporation of the water can be avoided. By this means in some cases there is an increase of the color strength as compared with the initial suspension.

The present process is in principle suitable for the treatment of all organic, water-insoluble dyestuffs, corresponding to the above definition and whose use requires particles of soft grain. The success of the present process is probably explained by the fact that pigments which occur in very fine and probably also more or less amorphous form, owing to their amorphous character, on drying have a particular tendency to coarsening of the grain, i.e. caking together of the amorphous particles. When such starting materials are treated by the present process, there takes place in the aqueous medium at the high temperatures used, a better disposition of the crystal surfaces without noteworthy crystal growth. These better formed crystals then incline less to caking on normal drying. This theory is supported by the fact that in some products a sharper configuration of the X-ray diagram is observed after treatment by the process of the invention.

The present process is of especial interest for the treatment of dyestuffs of the phthalocyanine series, for example metal-free phthalocyanine, copper phthalocyanine, and especially the chlorinated phthalocyanines, especially such as contain at least 14 chlorine atoms in the molecule. The crude pigments are advantageously subjected to the conversion as they are produced in the manufacturing process without intermediate drying. Patent No. 2,862,930, for example, describes an especially advantageous process for the manufacture of highly chlorinated phthalocyanines, in which the phthalocyanine is heated with chlorsulfonic acid, for example in an aluminium chloride-sodium chloride melt. When the halogenation is complete, the reaction mixture is poured into water and the dyestuff filtered off. In this condition the dyestuff is in a fine state of distribution but afer ordinary drying it is unsatsifactory for use as a pigment.

When treated by the present process, without intermediate drying, it gives a pigment that is distinguished from all known pigments of highly chlorinated copper phthalocyanines by an especially easy dispersibility in the various substrata.

The present process is of equally great value for vat dyestuffs of the anthraquinone series, for example for anthraquinone carbazoles such as 5:5'-dibenzoylaminodianthrimide carbazole or dibromoanthanthrone, dioxazine or quinacridone pigments.

The following examples illustrate the invention, the parts and percentages being by weight unless otherwise stated and the relation between part by weight and part by volume being the same as that between the kilogram and the liter.

Example 1

Into a stirring autoclave are introduced 200 parts of an aqueous filter product containing 24% of chlorinated copper phthalocyanine (chlorine content 48.2%) and also 400 parts of water and the whole is heated for 17 hours to 200–210° C. In this operation the pressure rises to 15–17 atmospheres. After cooling, the pigment is filtered off and dried under vacuum at 80° C. There is obtained a bright green powder of soft grain which is extremely readily distributed in a wide variety of media and yields very powerful brilliant green dyeings.

The aqueous filter product used as starting material was obtained by chlorination of copper phthalocyanine in an aluminium chloride melt, pouring the melt into water and removing the inorganic constituents by acidification, filtration and washing with water.

Example 2

200 parts of the starting material used in Example 1 and 400 parts of water are heated in a stirring autoclave for 17 hours to 270–280° C. The pressure rises to 54–63 atmospheres. After cooling, the pigment is filtered off and dried under vacuum at 80° C. A pigment powder is obtained with practically the same qualities as that obtained according to Example 1.

Example 3

400 parts of the filter product used in Example 1 and 20 parts of the sodium salt of p-toluene sulfonic acid are heated in a stirring autoclave for 12 hours to 270–280° C. and then worked up as in Example 1. A soft, very easily distributed powder is obtained of high coloring power.

Example 4

20 parts of the filter product used in Example 1 are boiled under reflux for 15 hours in 100 parts by volume of 40% sulfuric acid, then filtered hot, washed until neutral and dried under vacuum at 80° C. A soft pigment powder is obtained which is easily distributed and of strong coloring power.

A powder of similar coloring and physical properties is also obtained using a sulfuric acid for example of 60% strength.

Example 5

20 parts of the filter product used in Example 1 and 100 parts of water are boiled under reflux for 20 hours with stirring, then filtered and dried under vacuum. The powder is easily dispersible in organic media.

By using instead of water 18% sodium chloride solution and before drying thoroughly washing with water, a powder is obtained of still somewhat better dispersibility.

Example 6

50 parts of the filter product used in Example 1 are boiled for 20 hours under reflux with 200 parts of water, 0.2 part of dichlorobenzene and 0.05 part of an emulsifier consisting of 1 part of sodium diisobutylnaphthalene sulfonate and 2 parts of powdered glue, then filtered, thoroughly washed with water and dried under vacuum at 80° C. An easily dispersible, bright green powder is obtained.

Example 7

200 parts of an aqueous filter product of chlorinated copper phthalocyanine obtained by pouring an aluminium chloride melt into water as described in Example 1 of French Patent 1,444,397, and 500 parts of water are heated under reflux for 10 hours, filtered hot and dried in vacuo at 60° C.

Example 8

400 parts of the filter product of chlorinated copper phthalocyanine used in Example 14 are heated with 400 parts of water in an autoclave for one hour at 210–220° C. After cooling, the product is filtered and dried at 60° C. in vacuo.

What is claimed is:

1. A process for the manufacture of soft grained pigment of highly chlorinated copper phthalocyanine, which comprises heating at a temperature between the boiling point of water and 180° C. for at least 5 hours the crude pigment in water, and then removing the water.

2. A process for the manufacture of soft grained pigment of highly chlorinated copper phthalocyanine which comprises heating the crude pigment at a temperature between 180–300° C. in water for at least 1 hour and removing the water.

3. A process for the manufacture of soft grained pigment of highly chlorinated copper phthalocyanine which comprises heating the crude pigment in its initial, finely dispersed form at a temperature between 180–300° C. in water for at least 5 hours and removing the water.

References Cited in the file of this patent

UNITED STATES PATENTS

| Number | Name | Date |
|---|---|---|
| 2,214,454 | Dent | Sept. 10, 1940 |
| 2,375,120 | Loukomsky et al. | May 1, 1945 |
| 2,378,283 | Bucher | June 12, 1945 |
| 2,549,842 | Moser | Apr. 24, 1951 |
| 2,799,595 | Kudzin | July 16, 1957 |
| 2,857,400 | Cooper | Oct. 21, 1958 |